US011778116B2

(12) United States Patent
Ishiyama

(10) Patent No.: US 11,778,116 B2
(45) Date of Patent: Oct. 3, 2023

(54) PRINTING DEVICE OPERABLE WITH POWER FROM BATTERY AND EXTERNAL POWER SOURCE

(71) Applicant: BROTHER KOGYO KABUSHIKI KAISHA, Nagoya (JP)

(72) Inventor: Tetsuya Ishiyama, Chita (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/213,580

(22) Filed: Mar. 26, 2021

(65) Prior Publication Data

US 2021/0306502 A1    Sep. 30, 2021

(30) Foreign Application Priority Data

Mar. 30, 2020  (JP) ................. 2020-059984

(51) Int. Cl.
   *H04N 1/00*    (2006.01)
(52) U.S. Cl.
   CPC ..... *H04N 1/00904* (2013.01); *H04N 1/00901* (2013.01); *H04N 1/00907* (2013.01)
(58) Field of Classification Search
   None
   See application file for complete search history.

(56) References Cited

U.S. PATENT DOCUMENTS

2011/0316954 A1* 12/2011 Komatsu ........... H02J 7/007182
                                                        347/171
2017/0222434 A1*  8/2017 Yoshikoshi ............ G03G 15/00
2018/0345696 A1* 12/2018 Kodaira ................. B41J 2/0457
2019/0092025 A1*  3/2019 Kawai .................... B41J 2/2132
2020/0099814 A1*  3/2020 Horita ................ H04N 1/00893

(Continued)

FOREIGN PATENT DOCUMENTS

JP    2000211194 A  *  8/2000
JP    2002-099361 A     4/2002
JP    2004351899 A  * 12/2004

OTHER PUBLICATIONS

JP-2000211194-A (English Translation) H11-012648, par 0030-0037; Additional Corresponding Foreign Document (FOR) includes the English Translation of the Abstract (Year: 2000).*

(Continued)

*Primary Examiner* — Miya J Cato
(74) *Attorney, Agent, or Firm* — Kenealy Vaidya LLP

(57) ABSTRACT

According to aspects of the present disclosures, a printing device has a print head, a battery, a USB PD controller. The printing device is connected to an external power source in accordance with a connection compliant with a USB standard. The external power source has a plurality of electrical power profiles. The printing device uses one of the external power source and the battery as an electrical power supplying source of the print head. The printing device a power source voltage value with a rated voltage value of the print head, when the power source voltage value is larger than the rated voltage value, determine the battery as the electrical power supplying source, and, when the power source voltage value is equal to or less than the rated voltage value, determining the external power source as the electrical power supplying source.

10 Claims, 7 Drawing Sheets

(56) References Cited

U.S. PATENT DOCUMENTS

2021/0242701 A1* 8/2021 Watanabe ................ B41J 29/12
2021/0306500 A1* 9/2021 Ota ....................... G06F 3/1229

OTHER PUBLICATIONS

JP-2004351899-A (English Translation) 2003-155728 Application ; Abstract, Figs 5, 6, 0008, 0055-0062; Additional Corresponding Foreign Document (FOR) includes the English Translation of the Abstract (Year: 2004).*

* cited by examiner

BATTERY IS ATTACHED

| PROFILE No. | VOLTAGE | POWER | SUPPLIER: EXT. P. SOURCE | SUPPLIER: BATTERY | BATTERY CHARGING |
|---|---|---|---|---|---|
| 1 | 5V | 15W | PRINTABLE | UNPRINTABLE | UNCHARGEABLE |
| 2 | 9V | 27W | | | |
| 3 | 15V | 45W | UNPRINTABLE | PRINTABLE | CHARGEABLE |
| 4 | 20V | 60W | | | |
| 5 | 20V | 100W | | | |

FIG. 3A

BATTERY IS NOT ATTACHED

| PROFILE No. | VOLTAGE | POWER | SUPPLIER: EXT. P. SOURCE | SUPPLIER: BATTERY | BATTERY CHARGING |
|---|---|---|---|---|---|
| 1 | 5V | 15W | PRINTABLE | UNPRINTABLE | UNCHARGEABLE |
| 2 | 9V | 27W | | | |
| 3 | 15V | 45W | UNPRINTABLE | | |
| 4 | 20V | 60W | | | |
| 5 | 20V | 100W | | | |

PRINTING DEVICE OPERABLE WITH POWER FROM BATTERY AND EXTERNAL POWER SOURCE

CROSS-REFERENCE TO RELATED APPLICATIONS

This application claims priority under 35 U.S.C. § 119 from Japanese Patent Application No. 2020-059984 filed on Mar. 30, 2020. The entire subject matter of the application is incorporated herein by reference.

BACKGROUND

Technical Field

The present disclosures relate to a printing device.

Related Art

There has been known a printer having a USB interface, a battery, a printing mechanism and a power supplying line. Such a printer is generally configured to be connectable to a host computer which also serves as an external power source. The battery is typically a chargeable battery and can be connected to the USB interface through the power supplying line. The printing mechanism typically performs printing on a cut sheet and is connected to the USB interface through the power supplying line. According to the above configuration, the printer performs charging of the battery and printing using the electrical power supplied from the external power source.

SUMMARY

As power feeding based on a USB PD (USB power delivery), there is a case where the external power source is capable of supplying a plurality of voltage values, and a selected one of the plurality of voltage values is supplied to the printer. In such a case, there could be a situation where a voltage exceeding the rated voltage value of the printing mechanism is set from among the plurality of voltage values and supplied to the printer in order to charge the battery. In order to prevent the voltage exceeding the rated voltage value from being supplied to the printing mechanism, the printer is required to have a voltage lowering circuit configured to lower the voltage transmitted from the external power source on the power supplying line between the USB interface and the printing mechanism. Due to such a configuration, it is difficult to realize downsizing of such a printer.

According to aspects of the present disclosures, there is provided a printing device configured to be connected to an external power source capable of outputting an electrical power corresponding to one of a plurality of voltage values, including a voltage value obtaining part configured to obtain the plurality of voltage values from the external power source, a setting part configured to set an amplitude of the electrical power to be output by the external power source based on the plurality of voltage values obtained by the voltage value obtaining part, a print head with a particular rated voltage value configured to perform printing on a printing medium using an electrical power supplied from an electrical power supplying source, the electrical power supplying source being one of the external power source and a battery charged by the electrical power supplied by the external power source, and a controller. The controller is configured to perform obtaining a power source voltage value which is the voltage value of the electrical power set by the setting part, comparing the power source voltage value with the rated voltage value, when the power source voltage value is larger than the rated voltage value, determining the battery as the electrical power supplying source, and when the power source voltage value is equal to or less than the rated voltage value, determining the external power source as the electrical power supplying source.

According to aspects of the present disclosures, there is provided a printing device connectable to an external power source which is configured to output a source power corresponding to one of a plurality of voltage values, the printer including a print head configured to perform printing on a printing medium, a rechargeable battery detachably attached to the printing device, a first line configured to transmit an electrical power discharged by the battery to the print head, a first switch configured to switch start and stop of transmission of the electrical power through the first line, a USB port connected to the external power source in accordance with a connection compliant with a USB standard, the USB port being configured to relay the electrical power supplied by the external power source, a second line configured to transmit the electrical power relayed by the USB port to the print head, a second switch configured to switch start and stop of transmission of the electrical power through the second line, a third line configured to transmit the electrical power relayed by the USB port to the battery, a setting part configured to set an amplitude of the source power output by the external power source, and a first controller configured to control switching of the first switch and the second switch based on the voltage value of the source power set by the setting part.

BRIEF DESCRIPTION OF DRAWINGS

FIG. 3A is a table showing a relationship between an electrical profile of an external power source, a printing capability by a printer, and a charging possibility of a battery when the battery is connected.

FIG. 3B is a table showing a relationship between the electrical profile of the external power source, the printing capability by the printer when the battery is not connected.

DETAILED DESCRIPTION OF THE EMBODIMENT

Figure 1:
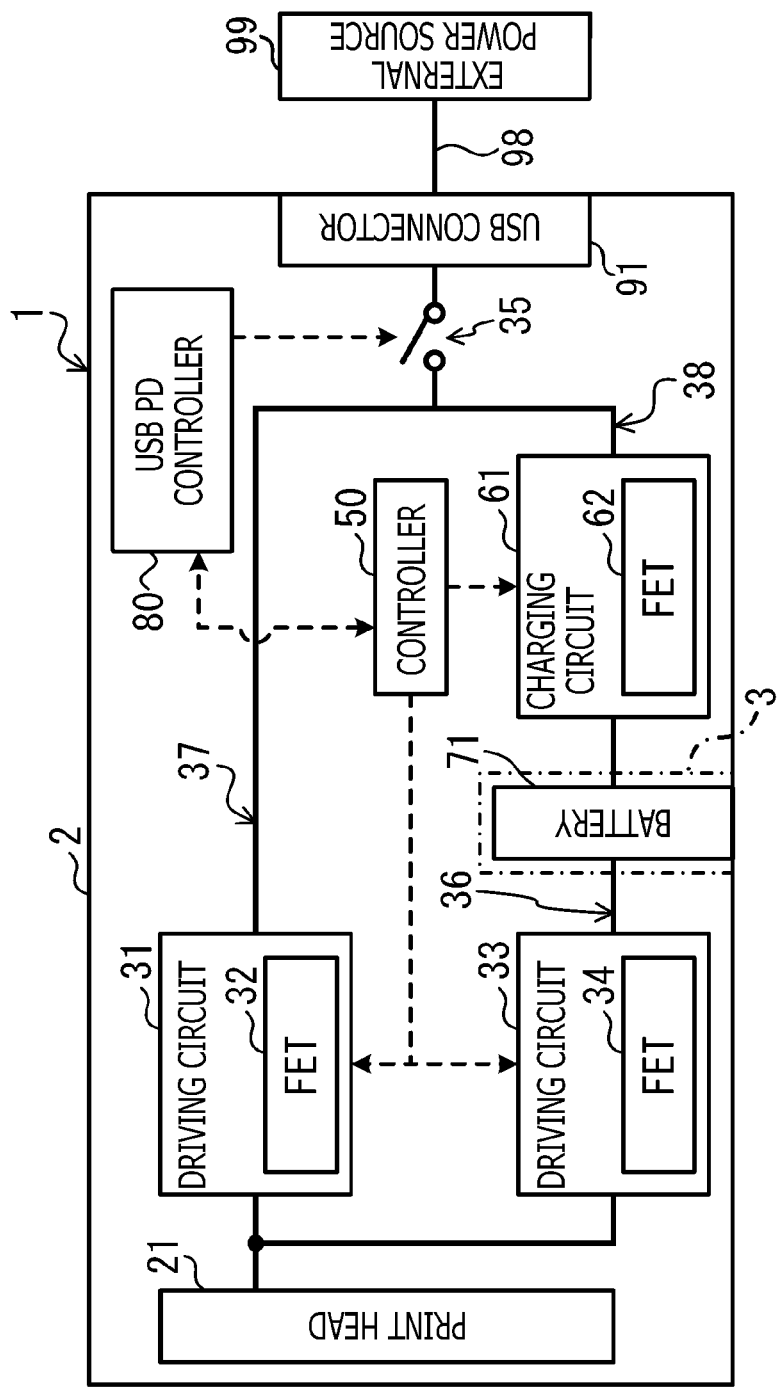
FIG. 1 is a block diagram showing an electrical system of a printing device.

Hereinafter, referring to the drawings, an embodiment according to aspects of the present disclosures will be described. It is noted that the drawings are merely referred to explain technical characteristics according to aspects of the present disclosures. A configuration of devices shown in the drawings are only examples for the purpose of explanation and are not intended to limit aspects of the present disclosures.

A printing device 1 is a thermal transfer printer configured to operate by an electrical power supplied from one of an external power source 99 and a battery 71. The printing device 1 is configured to print characters (e.g., objects such as letters, symbols, numerals, and figures) on a printing medium (e.g., a thermosensitive label).

Firstly, referring to FIG. 1, a configuration of the printing device 1 will be described. The printing device 1 has a housing 2. On a surface of the housing 2, an input part 5, a USB connector 91 are provided. The input part 5 is configured to receive user's operations. The USB connector 91 is a connection port used to connect the printing device 1 to a USB device such as the external power source 99 through a cable 98 compliant with a USB PD (USB Power Delivery) standard.

The external power source 99 is, for example, a general-purpose personal computer, a mobile terminal, a tablet terminal and the like. The external power source 99 has a plurality of electrical power profiles (see FIG. 3) based on a power rule according to the USB PD standard. Each electrical power profile corresponds to a particular electrical power and a particular voltage (hereinafter, referred to as a power source voltage value) which can be output by the external power source 99. According to the present embodiment, the power source voltage values corresponding to the electrical power profiles of the external power source 99 are 5V, 9V, 15V and 20V, respectively. The external power source 99 is configured to output an electrical power (where, amplitude of the voltage is the power source voltage value) corresponding to one of the plurality of electrical power profiles to the printing device 1. The USB connector 91 is configured to relay the electrical power supplied from the external power source 99 (hereinafter, referred to as a source power).

Inside the housing 2, a mounter 3, a print head 21, a first line 36, a second line 37, a third line 38, driving circuits 31 and 33, a charging circuit 61, a controller 50, a USB PD controller 80 and the like are provided. To the mounter 3, the battery 71 can be detachably mounted. The battery 71 may be a lithium-ion battery, an electrical double-layer capacitor or the like. According to the present embodiment, the voltage of the battery 71, when fully charged, is 8.4V.

The print head 21 generates heat by the electrical power supplied from one of the external power source 99 and the battery 71, thereby performing printing on the printing medium. The print head 21 has a particular rated voltage value. According to the present embodiment, the rated voltage value for the print head 21 is 9V.

The first line 36 connects the battery 71 attached to the mounter 3 with the print head 21. The first line 36 is configured to send the electrical power (maximum voltage: 8.4V) discharged by the battery 71 to the print head 21. It is noted that a voltage lowering circuit, which is configured to lower the voltage transmitted from the battery 71 to the print head 21, is not provided to the first line 36. Therefore, along the first line 36, the voltage is not lowered except for a small amount of voltage lowering due to resistance elements or the like for circuit protection. In the following description, a connection, in the electrical power supplying passage and the like, without a voltage lowering circuit for lowering the voltage to be transmitted will be referred to as a direct connection.

On the first line 36, the driving circuit 33 is provided. The driving circuit 33 is an electronic circuit configured to control driving of the print head 21. The driving circuit 33 includes an FET 34, which is a switching element. The FET 34 is configured to change its state between an ON state and an OFF state in accordance with a command output by the controller 50. When the FET 34 is in the ON state, the first line 36 transmits electricity from the battery 71 to the print head 21. When the FET 34 is in the OFF state, the first line 36 stops transmitting electricity from the battery 71 to the print head 21.

The third line 38 is directly connected (i.e., connected without a voltage lowering circuit) to the battery 71 attached to the mounter 3 and the USB connector 91 with a switch 35 provided therebetween. The third line 38 is configured to transmit the electrical power relayed by the USB connector 9 to the battery 71 attached to the mounter 3. It is noted that, along the third line 38, the voltage is not lowered except for a small amount of voltage lowering due to resistance elements or the like for circuit protection.

On the third line 38, the charging circuit 61 is provided. The charging circuit 61 is an electronic circuit configured to control charging of the battery 71. The charging circuit 61 includes an FET 62, which is a switching element. The FET 62 is configured to change its state between an ON state and an OFF state in accordance with a command output by the controller 50. When the FET 62 is in the ON state, the third line 38 transmits electricity from the USB connector 91 to the battery 71. When the FET 62 is in the OFF state, the third line 38 stops transmitting electricity from the USB connector 91 to the battery 71.

The second line 37 is directly connected to the print head 21 and the USB connector 91 with the switch 5 therebetween. The second line 37 is configured to transmit the electrical power relayed by the USB connector 91 to the print head 21. It is noted that, along the second line 37, the voltage is not lowered except for a small amount of voltage lowering due to resistance elements or the like for circuit protection.

On the second line 37, the driving circuit 31 is provided. The driving circuit 31 is, similar to the driving circuit 33, an electronic circuit configured to control driving of the print head 21. The driving circuit 31 includes an FET, which is a switching element. The FET 32 is configured to change its state between an ON state and an OFF state in accordance with a command output by the controller 50. When the FET 32 is in the ON state, the second line 37 transmits electricity from the USB connector 91 to the print head 21. When the FET 32 is in the OFF state, the second line 37 stops transmitting electricity from the USB connector 91 to the print head 21.

As shown in FIG. 1, the switch 35 is provided such that one end of the switch 35 is connected to the USB connector 91 and the other end of the switch 35 is connected to both the second and third lines 37 and 38. The switch 35 is configured to change its state between an ON state and an OFF state in accordance with a command output by the USB PD controller 80. When the switch 35 is in the ON state, the electrical power relayed by the USB connector 91 is transmitted to the driving circuit 31 and the charging circuit 61. When the switch 35 is in the OFF state, transmission of the electrical power relayed by the USB connector 91 to the driving circuit 31 and the charging circuit 61 is stopped.

The controller 50 is configured to control the printing device 1 totally. The controller 50 is configured to communicate with the USB PD controller 80 and control the same. The USB PD controller 80 transmits a control result (e.g., information indicating operations of the USB PD controller 80 controlled by the controller) to the controller 50. Then, the controller 50 performs a feed-back control of the FETs 32, 34 and 62 based on the control result received from the USB PD controller 80.

Figure 2:
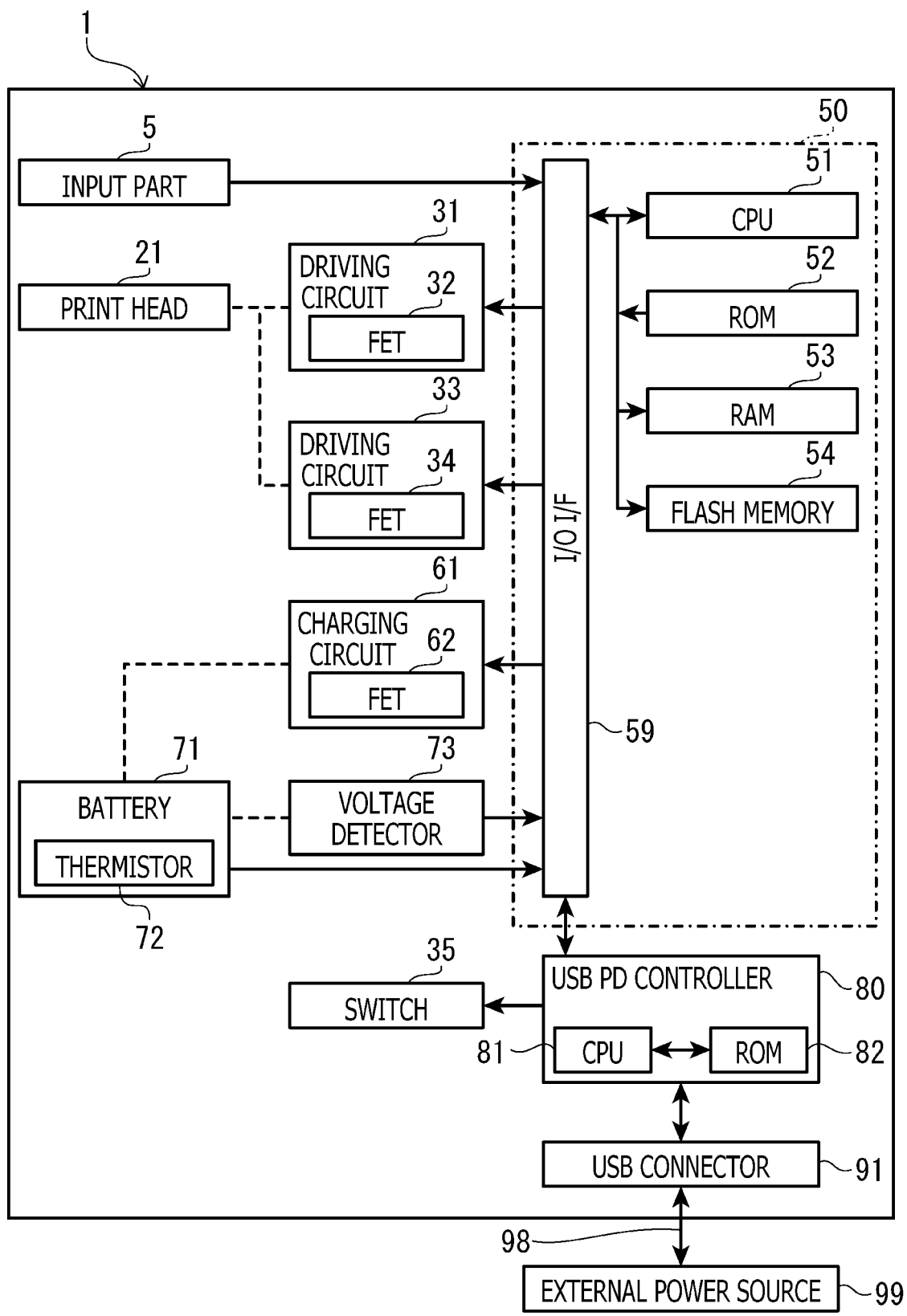
FIG. 2 is a block diagram showing an electrical configuration of the printing device.

Next, referring to FIG. 2, an electrical configuration of the printing device 1 will be described. The controller 50 includes a CPU 51, a ROM 52, a RAM 53, a flash memory

54, and an JO I/F (Input and Output Interface) 59. The ROM 52, the RAM 53, the flash memory 54 and the JO I/F 50 are electrically connected to the CPU 51.

The CPU 51 is configured to execute various programs to control the printing device 1. The ROM 52 is configured to store the various program to be executed by the CPU 51. The RAM 53 is configured to temporarily store flags, counters, results of operations and the like. The flash memory 54 is configured to store various settings for the printing device 1 and the like.

The printing device 1 is further provided with a voltage detector 73. The voltage detector 73 is configured to detect a voltage of the battery 71. The voltage detector 73 is electrically connected to the CPU 51 through the IO I/F 59. The battery 71 is provided with a thermistor 72 configured to detect a temperature of the battery 71. The thermistor 72 is electrically connected to the CPU 51 through the IO I/F 59. The input part 5 is configured to input various commands to the controller 50 in accordance with operations thereof by a user.

The CPU 51 controls the charging circuit 61, thereby controlling the charging of the battery 71. The printing device 1 is configured not to perform the charging of the battery 71 and the printing with print head 2 simultaneously. When charging the battery 71, the CPU 51 sets the FET 62 to the ON state and the FET 34 to the OFF state.

The CPU 51 controls the FETs 32 and 34 so that only one of the first line 36 and the second line 37 transmitting electricity to the print head 21. When the first line 36 transmits electricity to the print head 21, the electrical power supplying source for the print head 21 is the battery 71. In this case, the CPU 51 sets the FET 34 to the ON state and the FETs 32 and 62 to the OFF state. When the second line 37 transmits electricity to the printer 21, the electrical power supplying source is the external power source 99. In this case, the CPU 51 sets the FET 32 to the ON state and the FETs 34 and 62 to OFF states, respectively.

The USB PD controller 80 is electrically connected to the CPU 51 through the IO I/F 59 and to the external power source 99 through the USB connector 91. The USB PD controller 80 controls the switch 35 and communicates with the external power source 99 in accordance with a command output by the CPU 51. The USB PD controller 80 includes a CPU 81 and a ROM 82. The CPU 81 is configured to execute various programs which are stored in the ROM 82.

Referring to FIGS. 3A and 3B, controlling of the printing device 1 will be described. When the USB connector 91 is electrically connected to the external power source 99, the CPU 81 communicates with the external power source 99 and obtains a plurality of electrical power profiles from the external power source 99. Then, the CPU 81 selects one of the multiple electrical power profiles as obtained, and outputs a selection result to the CPU 51 and the external power source 99. The external power source 99 outputs electrical power corresponding to the selected electrical power profile.

As an example, it is assumed that the battery 71 is attached to the mounter 3 and the external power source 99 has a plurality of profiles No. 1-No. 5 as shown in FIG. 3A, and that the CPU 81 selects profile No. 3 from the plurality of profiles to supply power to the print head 21 from the battery 71. Then, the CPU 51 obtains a power source voltage value 15V of profile No. 3 from the CPU 81. The power source voltage value 15V of profile No. 3 is larger than the rated voltage value (i.e., 9V) of the print head 21. Therefore, in this case, the CPU 51 does not transmit electricity through the second lien 37, but transmits the electrical power to the battery 71 through the third line 38, thereby the battery 71 being charged with the electrical power transmitted through the third line 38. Further, in order to perform printing, the CPU 51 sets the electrical power supplying source for the print head 21 to the battery 71. When printing is performed, the CPU 51 sets the FET 34 to the ON state and FETs 32 and 62 to the OFF states. Then, the charging of the battery 71 is stopped and printing with the print head 21 is performed.

When the print head 21 performs printing using the electrical power of the battery 71, there is a case that the voltage of the battery 71 is lowered and charging of the battery 71 becomes necessary. In such a case, the CPU 51 sets the FET 62 to the ON state and the FETs 32 and 34 to the OFF states. When the print head 21 is performing the printing, the printing is paused and charging of the battery 71 starts.

As an example, it is assumed that the external power source 99 has electrical power profiles of No. 1 and No. 2 shown in FIG. 3A, and that the CPU 81 selects profile No. 2 to supply power the print head 21 of which the rated voltage value is 9V. Then, the CPU 51 obtains the power source voltage value 9V of profile No. 2 from the CPU 81. The power source voltage value (9V) is equal to or less than the rated voltage value (9V) of the print head 21. In this case, the CPU 51 sets the power supplying source for the print head 21 to the external power source 99. The CPU 51 does not transmit electricity through the third line 38, but transmits the electrical power to the print head 21 through the second line 37. In this case, charging of the battery 71 is not performed. When printing is performed, the CPU 51 sets the FET 32 to the ON state and sets the FETs 34 and 62 to the OFF states.

There could be a case where the battery 71 is not attached to the printing device 1. The CPU 51 is configured to detect whether the battery 71 is attached to the printing device 1 based on an electrical connection between the thermistor and the battery 71. For example, when the external power source 99 has profiles Nos. 1-5 shown in FIGS. 3A and 3B, if the electrical powers corresponding to profiles Nos. 3-5 are supplied from the external power source 99, the print head 21 could be damaged or broken.

When the CPU 51 determines that the battery 71 is not attached to the printing device 1, the CPU 51 transmits a command to select a profile corresponding to the voltage which is equal to or lower than the rated voltage value (9V) of the print head 21 to the CPU 81. Then, the CPU 51 sets the power supplying source for the print head 21 to the external power source 99. The CPU 51 does not transmit electricity through the third line 38, but transmits the electrical power to the print head 21 through the second line 37. When printing is performed, the CPU 51 sets the FET 32 to the ON state and sets the FETs 34 and 62 to the OFF states.

Next, referring to a flowchart shown in FIGS. 4, 5A and 5B, a printing process performed by the CPU 51 will be described. The printing process is a process of determining the power supplying source for the print head 21 and performing printing with the print head 21. It is noted that, when the printing process is started, all the FETs 32, 34 and 62 are OFF states.

In response to connection of the external power source 99 to the USB connector 91, the CPU 51 retrieves the program for the printing process stored in the ROM 52 and performs the printing process. In parallel with the printing process performed by the CPU 51, the CPU 81 retrieves a program for an electrical power determining process (described later) stored in the ROM 82 and performs the electrical power determining process.

Figure 4:
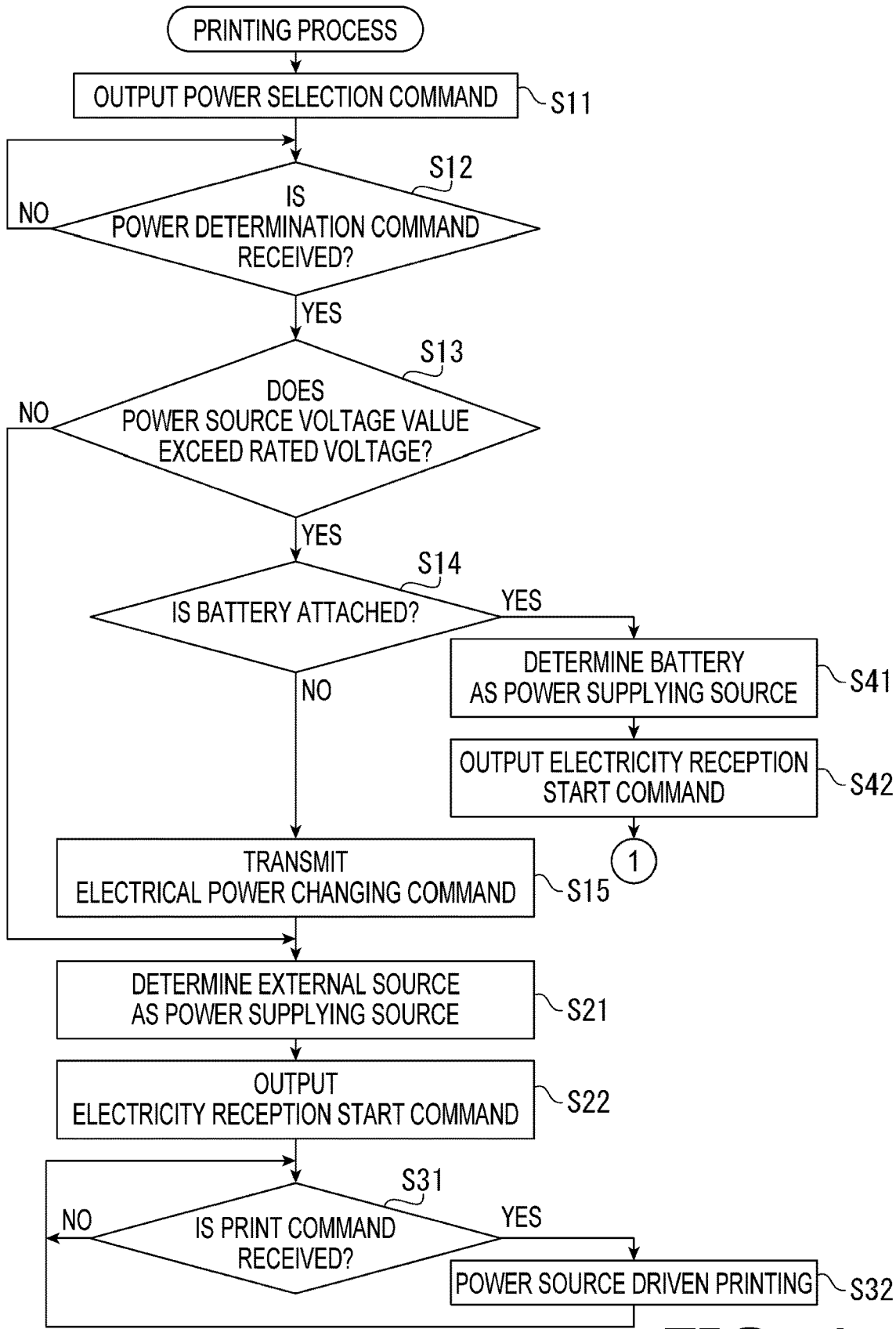
FIGS. 4, 5A, and 5B show a flowchart illustrating a printing process performed by a CPU of the printer.
Figure 5A:
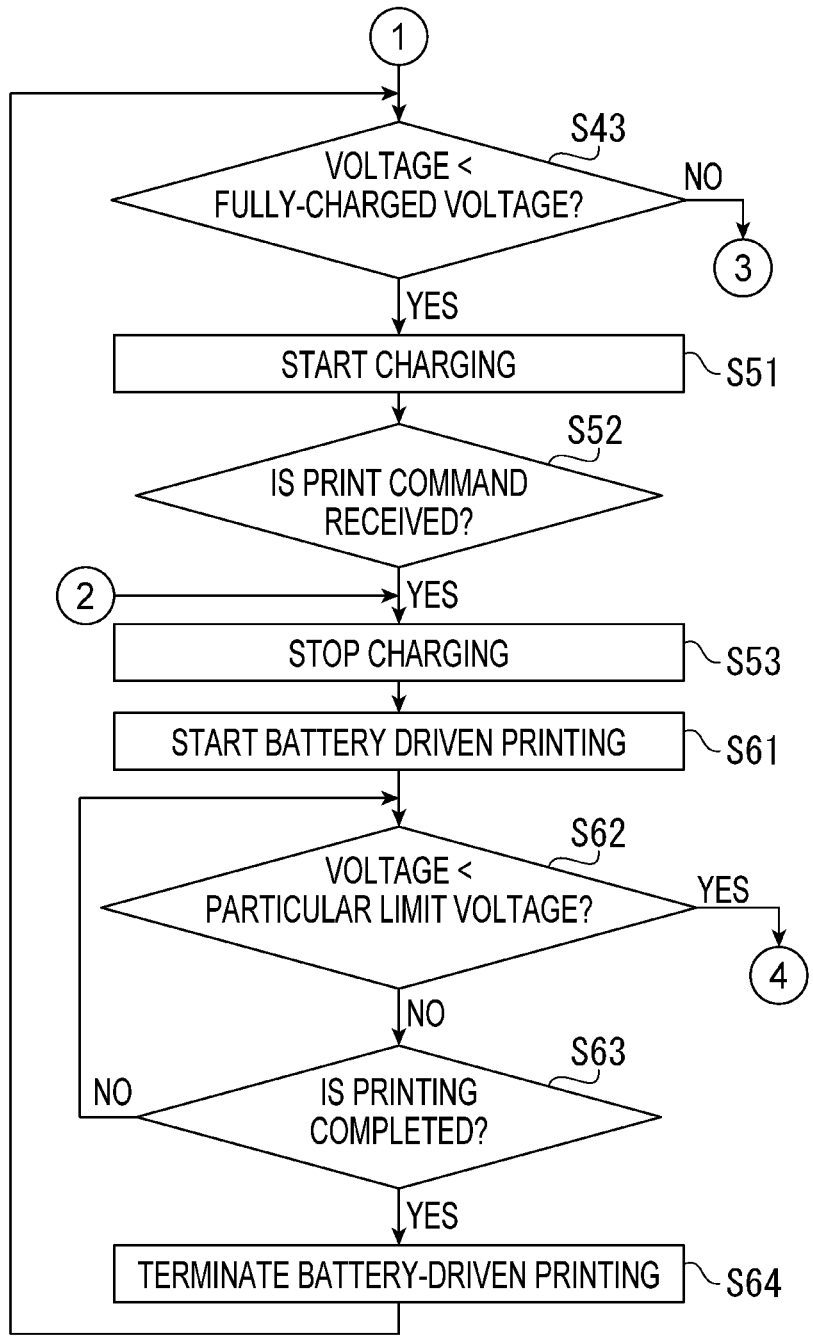
Figure 5B:
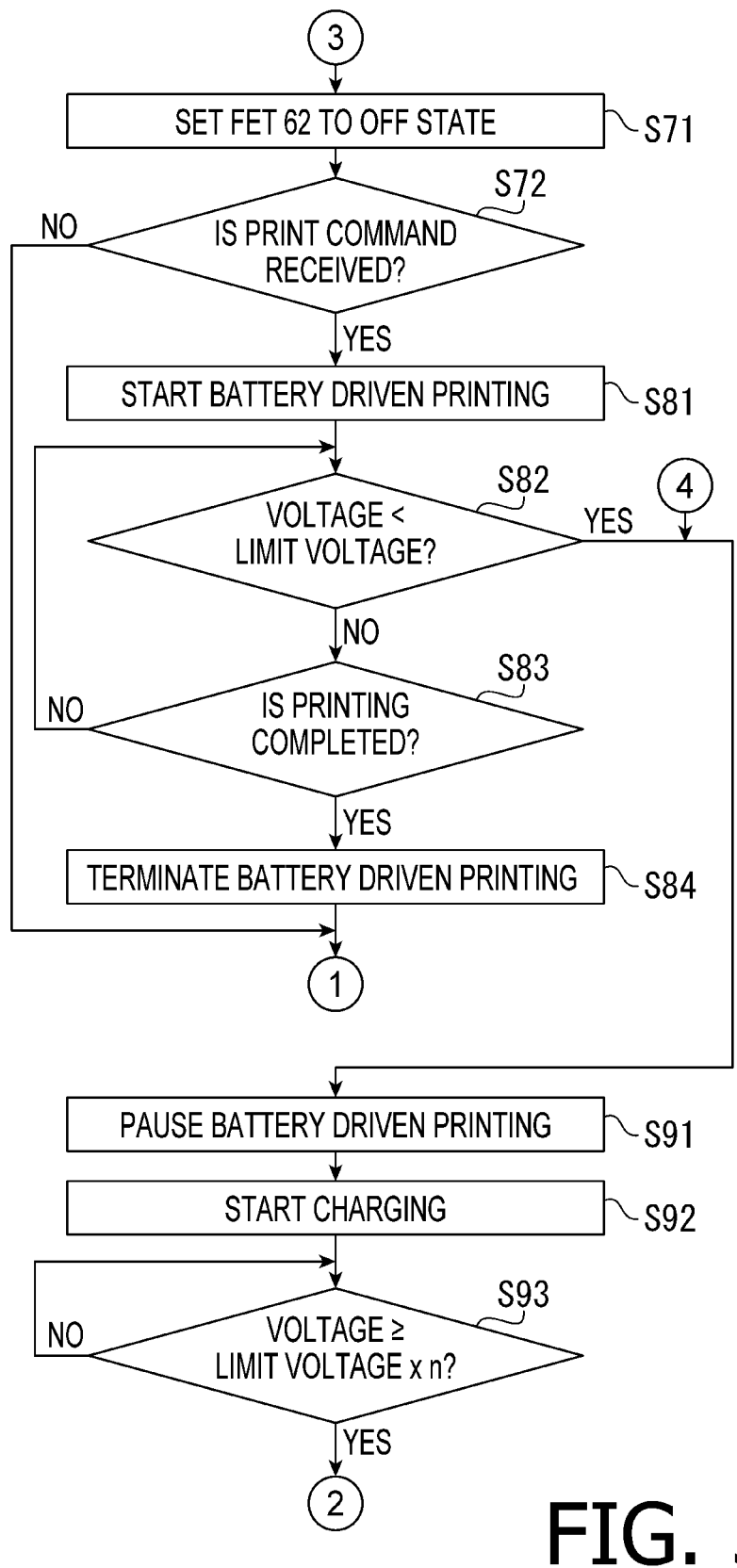
Figure 6:
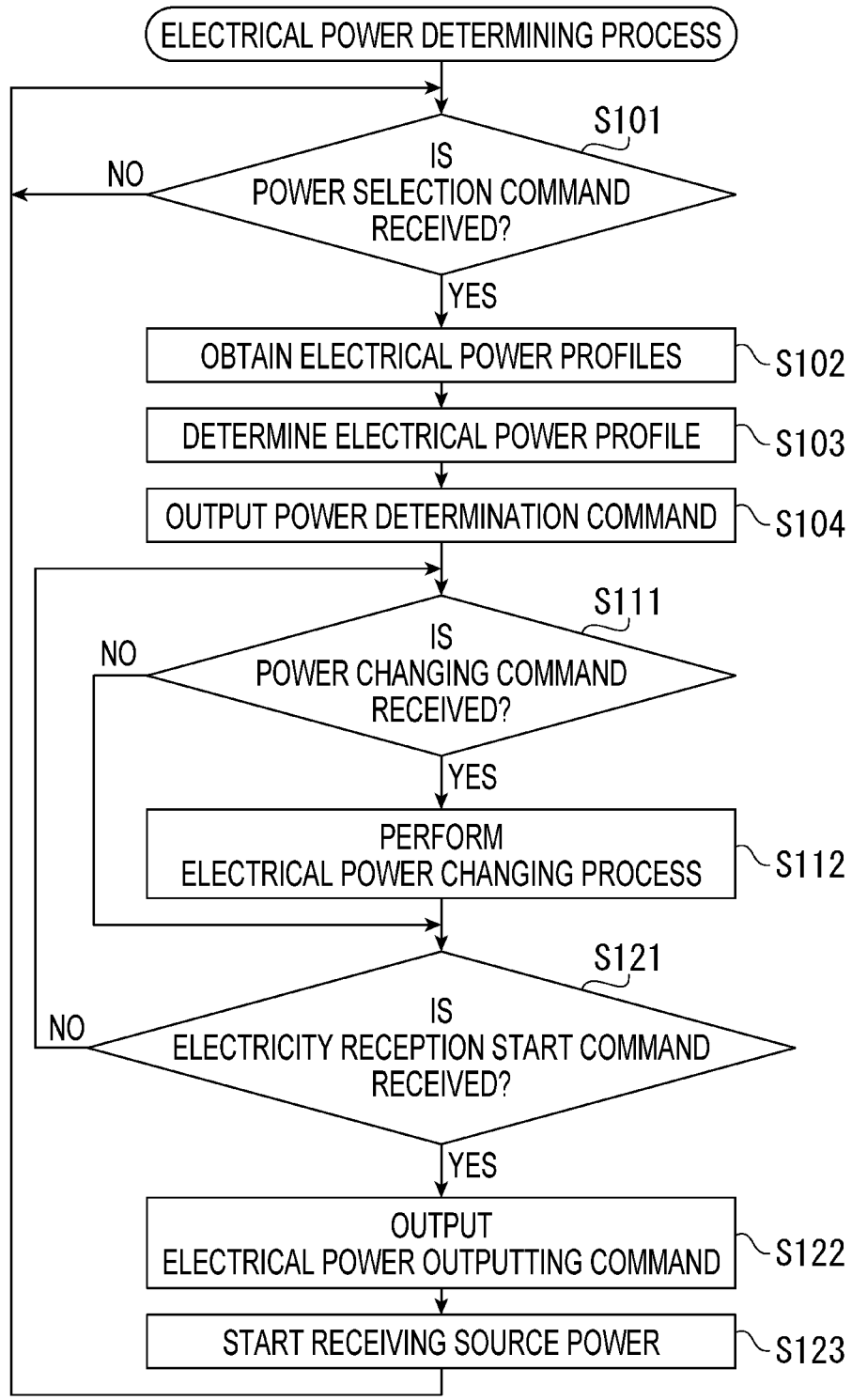
FIG. 6 is a flowchart illustrating an electrical power determining process performed by the CPU of the printer.

As shown in FIG. 4, when the printing process is started, the CPU 51 output a power selection command to the CPU 81 (S11). When receiving the electrical power determining process, the CPU 81 performs an electrical power determining process, which is shown in FIG. 6. In the electrical power determining process, the CPU 81 communicates with the external power source 99 to obtain at least one electrical power profile, and selects an electrical power profile and determines the selected profile as the profile to be used. When the electrical power profile is determined, the CPU 81 outputs a power determination command to the CPU 51. It is noted that the power determination command includes information on a power source voltage value corresponding to the electrical power profile determined by the CPU 81.

The CPU 51 determines whether the power determination command is received from the CPU 81 (S12). When determining that the power determination command is not received from the CPU 81 (S12: NO), the CPU 51 pauses. When determining that the power determination command is received from the CPU 81 (S12: YES), the CPU 51 determines whether the power source voltage value of the determined electrical power profile exceeds the rated voltage value of the print head 21 based on the power determination command (S13). When determining that the power source voltage value of the determined electrical power profile is equal to or less the rated voltage value of the print head 21 (S13: NO), the CPU 51 proceeds to S21.

When determining that the power source voltage value of the determined electrical power profile exceeds the rated voltage value of the print head 21 (S13: YES), the CPU 51 determines whether the battery 71 is attached to the mounter 3 (S14). In S14, the CPU 51 makes a determination based on whether there is an electrical connection with the thermistor. When determining that there is an electrical connection with the thermistor and that the battery 71 is attached to the mounter 3 (S14: YES), the CPU 51 determines the battery 71 as the power supplying source (S41).

When no electrical connection with the thermistor is detected, and thus the battery 71 is not attached to the mounter 3 (S14: NO), the CPU 51 transmits an electrical power changing command to the CPU 81 (S15). When receiving the power selection command, the CPU 81 changes the electrical power profile from the determined profile to a profile corresponding to the power source voltage value equal to or smaller than the rated voltage value of the print head 21. Then, the CPU 51 proceeds to S21.

When the power source voltage value of the determined electrical power profile is equal to or less than the rated voltage value of the print head 21 (S13: NO), or when the battery 71 is not attached to the mounter 3 (S14: NO), the CPU 51 determines the external power source 99 as the power supplying source for the print head 21 (S21). In this case, the power source voltage value of the determined electrical power profile is equal to or less than the rated voltage value of the print head 21. Then, the CPU 51 output an electricity reception start command to the CPU 81 (S22). When receiving the electricity reception start command, the CPU 81 switches the state of the switch 35 to the ON state in the electrical power determining process. The printing device 1 starts receiving electricity from the external power source 99.

In S31, the CPU 51 determines whether a print command is received from the input part 5. When printing with use of the print head 21 is performed, the user operates the input part 5, thereby the input part 5 transmitting the print command to the CPU 51. When determining that the print command is not received (S31: NO), the CPU 51 pauses.

When determining that the print command is received (S31: YES), the CPU 51 performs a power source driven printing (S32). When performing the power source driven printing, the CPU 51 sets the FET 32 to the ON state. Then, the electricity transmission through the second line 37 is started, thereby the electrical power being transmitted to the print head 21 from the external power source 99. The CPU 51 control driving of the print head 21 through the driving circuit 31 to perform printing. After execution of the power source driven printing, the CPU 51 proceeds to S31. Then, the CPU 51 pauses until a next print command is received, and performs the power source driven printing in response to receipt of the next print command (S31 and S32).

After determining the battery 71 as the power supplying source (S41), the CPU 51 outputs the electricity reception start command to the CPU 81 (S42). It is noted that a process in S42 is the same as the process in S22. The CPU 81 sets the switch 45 to the ON state. The printing device 1 starts receiving electricity from the external power source 99. Then, the CPU 51 proceeds to S43 (see FIGS. 5A and 5B).

The CPU 51 determines whether the voltage of the battery 71 is less than a fully-charged voltage value (8.4V) based on a detection result of the voltage detector 73 (S43). When determining that the voltage of the battery 71 is less than the fully-charged voltage (S43: YES), the CPU 51 sets the FET 62 to the ON state to start charging the battery 71 (S51). Then, the CPU 51 determines whether the print command is received from the input part 5 (S52). It is noted that a process in S52 is the same as the process in S31. When determining that the print command is not received (S52: NO), the CPU 51 returns to S43.

When determining that the print command is received (S52: YES), the CPU 51 sets the FET 62 to the OFF state to stop charging the battery 71 (S53). Then, the CPU 51 starts performing a battery driven printing (S61). When the battery driven printing is started, the CPU 51 sets the FET 34 to the ON state. Then, transmission of electricity through the first line 36 is started, and the electrical power is supplied to the print head 21 from the battery 71. The CPU 51 controls driving of the print head 21 through the driving circuit 3 to start printing.

During the printing, the CPU 51 determines whether the voltage of the battery 71 is less than a particular limit voltage based on the detection result of the voltage detector 73 (S62). The limit voltage is a lower limit voltage value necessary to drive the print head 21. When the voltage of the battery 71 is equal to or greater than the limit voltage (S26: NO), the CPU 51 determines whether printing on the printing medium is completed (S63). When determining that the printing is not completed (S63: NO), the CPU 51 returns to S62. The CPU 51 repeatedly executes steps S62 and S63 until the printing of the printing medium is completed.

When determining that the printing is completed (S63: YES), the CPU 51 terminates the battery-driven printing (S64). When the battery driven printing is terminated, the CPU 51 sets the FET to the OFF state. Then, transmission of the electricity to the print head 21 through the first line 36 is finished. Thereafter, the CPU 51 returns to S43.

When determining, during the printing, that the voltage of the battery 71 becomes less than the limit voltage (S62: YES), the CPU 51 pauses the battery driven printing (S91). When the battery driven printing is terminated, the CPU 51 sets the FET 34 to the OFF state. Then, transmission of the electricity to the print head 21 through the first line 36 is terminated. Then, as in S51, the CPU 51 set the FET 62 to the ON state to start charging the battery 71 (S92).

In S93, the CPU 51 determines whether the voltage of the battery 71 is equal to or larger than constant n times the limit voltage (S93). The constant n is a particular number which is larger than one and determines so that n times the limit voltage is equal to or less than the fully-charged voltage. When determining that the voltage of the battery 71 is less than n times the limit voltage (S93: NO), the CPU 51 keeps pausing the battery driven printing, and continues charging the battery 71. When determining that the voltage of the battery 71 is equal to or larger than n times the limit voltage (S93: YES), the CPU 51 proceeds to S53. In S53, the CPU 51 sets the FET 62 to the OFF state to stop charging the battery 71 and restores the battery driven printing (S61).

When determining that the voltage of the battery 71 is not less than (i.e., equal to) the fully-charged voltage (S43: NO), the CPU 51 sets the FET 62 to the OFF state (S71). When the battery 71 is being charged, the charging is terminated. It is noted that when the voltage of the battery 71 is equal to the fully-charged voltage when the printing is started, the CPU 51 also executes S71. Then, the CPU 51 determines whether the print command is received from the input part 5 (S72). It is noted that the process in S72 is the same as the process in S31. When determining that the print command is not received (S72: NO), the CPU 51 returns to S43.

When determining that the print command is received (S72: YES), the CPU 51 starts performing the battery driven printing (S81). It is noted that the process in S81 is the same as the process in S61. When the battery driven printing is started, the CPU 51 sets the FET 34 to the ON state. Then, transmission of the electricity through the first line 36 is started, and the electricity is supplied to the print head 21 from the battery 71. The CPU 51 controls driving of the print head 21 through the driving circuit 33 to start printing on the printing medium.

Processes in S82-S84 are similar to the processes in S62-S64 and will be described briefly. The CPU 51 determines whether the voltage of the battery 71 is less than the limit voltage during the printing (S82). When determining that the voltage of the battery 71 is less than the limit voltage (S82: YES), the CPU 51 proceeds to S91. When determining that the voltage of the battery 71 is equal to or larger than the limit voltage (S82: NO), the CPU 51 determines whether printing on the printing medium is completed (S83). When determining that the printing is not completed (S83: NO), the CPU 51 returns to S81. When determining that the printing is completed (S83: YES), the CPU 51 terminates the battery driven printing (S84). Then, the CPU 51 sets the FET 34 to the OFF state. Thus, the transmission of electricity to the print head 21 through the first line 26 is stopped, and the CPU 51 returns to S43.

Next, referring to FIG. 6, a source power determining process will be described. The source power determining process is a process of determining the source power, and receiving the same from the external power source 99. The source power determining process is performed in parallel with the printing process (see FIG. 4) performed by the CPU 51. When the external power source 99 is connected to the USB connector 91, the CPU 81 retrieves the program stored in the ROM 82 and performs the source power determining process.

When the source power determining process is started, the CPU 81 determines, in S101, whether the CPU 81 has received the power selection command, which is output by the CPU 51 in S11 (see FIG. 4). When determining that the CPU 81 has not received the power selection command from the CPU 51 (S101: NO), the CPU 81 pauses. When determining that the CPU 81 has received the power selection command from the CPU 51 (S101: YES), the CPU 81 communicates with the external power source 99 and obtains multiple profiles the external power source 99 has (S102).

The CPU 81 selects one of the multiple electrical power profiles as obtained and determines the selected profile as the profile to be used (S103). When each of the power source voltage values for respective electrical profiles as obtained is equal to or less than 9V, the CPU 81 selects the electrical power profile for which the power source voltage value is the largest among the obtained multiple profiles and determines the selected profile as the profile to be used (S103). When the power source voltage values for some of the profiles are larger than 9V, the CPU 81 selects the electrical power profile for which the power source voltage value is the smallest from among the profiles for which the power source voltage values are larger than 9V, and determines the selected profile as the profile to be used. Then, in S104, the CPU 81 outputs the power determination command including information regarding the power source voltage value for the determined electrical power profile to the CPU 51 (S104).

The CPU 81 determines whether the CPU 81 has received the electrical power changing command output by the CPU 51 in S15 (see FIG. 4) in S111. When determining that the CPU 81 has not received the electrical power changing command from the CPU 51 (S111: NO), the CPU 81 process to S121. When determining that the CPU 81 has received the electrical power changing command from the CPU 51 (S111: YES), the CPU 81 performs an electrical power changing process (S112). In the electrical power changing process, the CPU 81 selects the electrical power profile for which the power source voltage value is the largest among the power source voltage values less than 9V, and determines the selected profile as the profile to be used. Then, the CPU 81 proceeds to S121.

In S121, the CPU 81 determines whether the CPU 81 has received the electricity reception start command output by the CPU 51 in S22 or S42 (see FIG. 4). When determining that the CPU 81 has not received the electricity reception start command from the CPU 51 (S121: NO), the CPU 81 returns to S111. Then, the CPU 81 repeatedly executes S111-S121 until the CPU 81 receives the electricity reception start command from the CPU 51. When determining that the CPU 81 has received the electricity reception start command from the CPU 51 (S121: YES), the CPU 81 outputs electrical power outputting command to the external power source 99 (S122). It is noted that the electrical power outputting command includes information on the electrical power profile the CPU 81 determined. The external power source 99 outputs, based on the power determination command, the source power corresponding to the electrical power profile determined by the CPU 81. The CPU 81 sets the switch 35 to the ON state to start receiving the source power (S123). Then, the CPU 81 returns to S101.

As described above, the printing device 1 is provided with the print head 21, the battery 71, and the USB PD controller 80. The printing device 1 is configured to connect to the external power source having multiple electrical power profiles compliant to the USB PD standard. The multiple electrical power profiles respectively correspond to the particular powers and power source voltage values, which can be output by the external power source 99. The external power source 99 outputs the electrical power corresponding to one of the multiple electrical power profiles as the source power. The printing device 1 performs the printing using one of the external power source 99 and the battery 71 as the electrical power supplying source for the print head 21. The CPU 81 of the USB PD controller 80 obtains multiple electrical power profiles from the external power source 99 (S102) and selects one of the multiple electrical power profiles as the power profile to be used (S103). The CPU 51 of the controller 50 compares the power source voltage value of the electrical power profile selected by the CPU 81 with the rated voltage value of the print head 21 (S13). When the power source voltage value of the electrical power profile exceeds the rated voltage value of the print head 21 (S13: YES), the printing device 1 uses the battery 1 as the electrical power supplying source (S41). When the power source voltage value of the electrical power profile is equal to or less than the rated voltage value of the print head 21 (S13: NO), the printing device 1 uses the external power source 99 as the electrical power supplying source (S21).

As above, when the voltage exceeding the rated voltage value is supplied from the external power source 99, the printing device 1 determines the battery 71 as the electrical power supplying source. Therefore, it is unnecessary to provide the voltage lowering circuit configured to lower the voltage supplied from the external power source 99 to the printing device 1. Accordingly, the printing device 1 can be downsized even if the printing device 1 is configured such that the source power is supplied from the external power source 9 which has multiple suppliable power source voltage values.

In the printing device 1, the battery 71 is detachably attached to the mounter 3. The CPU 51 determines whether the battery 71 is attached to the mounter 3 (S14). When determining that the battery 71 is attached to the mounter 3 (S14: NO), the CPU 51 outputs the electrical power changing command to the CPU 81 (S15). When receiving the power selection command, the CPU 81 changes the electrical power profile from the determined electrical power profile to the electrical power profile of which power source voltage value is equal to or less than the rated voltage value of the print head. Then, the CPU 51 determines the external power source 99 as the electrical power supplying source for the print head 21 (S21). As above, there could be a case where the battery 71 is not attached to the mounter 3 and the printing device 1 cannot set the battery 71 as the electrical power supplying source. In such a case, the external power source 99 can be used as the electrical power supplying source for the print head 21 even if the power source voltage value exceeds the rated voltage value, thereby the printing being performed.

The printing device 1 includes the voltage detector 73. The CPU 51 determines whether the voltage of the battery 71 is less than the limit voltage (S62, S82) when the electrical power supplying source for the print head 21 is the battery 71. When determining that the voltage of the battery 71 is less than the limit voltage (S62: YES, or S82: YES), the CPU 51 determines that the battery 71 should be charged. In such a case, the CPU 51 stops printing (S91) and starts charging the battery 71 (S92). As described above, when the voltage of the battery 71 becomes less than the limit voltage during the printing and it becomes necessary to charge the battery 71, the CPU 51 stops printing and starts charging the battery 71. Accordingly, it is possible to suppress the failure of printing due to a shortage of power supply from the battery 71 during printing.

The printing device 1 has the input part 5. When the electrical power supplying source for the print head 21 is the battery 71, the CPU 51 determines whether the voltage of the battery 71 is less than the fully-charged voltage based on the detection result of the voltage detector 73 (S43). When determining that the voltage of the battery 71 is less than the fully-charged voltage (S43: YES), the CPU 51 starts charging the battery 71 (S51). During the charging of the battery 71, the CPU 51 determines whether the print command is received from the input part (S52). When determining that the print command has been received (S52: YES), the CPU 51 stops charging the battery 71 (S53) and performs printing (S61). As above, when receiving the command to start printing from the input part 5 during the charging of the battery 71, the CPU 51 stops charging the battery 71 and starts printing. Therefore, printing by the printing device 1 can be performed at a user-desired timing.

The printing device 1 is provided with the USB connector 91 and configured to be connected with a device compliant with the USB standard. As described above, for example, the external power source 99 is configured to supply the electrical power to the printing device 1 through the USB connector 91. As above, the printing device 1 can be connected to various external devices through the USB connector 91 and an improved operability can be realized.

The printing device 1 is configured to be connected with the external power source 99, which has multiple electrical power profiles compliant with the USB PD standard. Each of the multiple electrical power profiles corresponds to particular electrical power and power source voltage value. The external power source 99 is configured to output the electrical power corresponding to one of the multiple electrical profiles as the source power.

The printing device 1 includes the print head 21, the battery 71, the first line 36, the second line 37, the third line 38, the FETs 32 and 34, the USB connector 91, the USB PD controller 80 and the controller 50. The first line 36 is configured to transmit the electrical power discharged by the battery 71 to the print head 21. The FET 34 is provided to the first line 36 and is configured to switch start and stop of transmission of electricity through the first line 36 by connecting and disconnecting between the battery 71 and the print head 21. The second line 37 is configured to transmit electrical power relayed by the USB connector 91 to the print head 21. The FET 32 is provided to the second line 37 and configured to switch start and stop of transmission of electricity through the second line 37 by connecting and disconnecting between the switch 35 and the print head 21. The third line 38 is configured to transmit the source power relayed by the USB connector 91 to the battery 71. The USB PD controller 80 is configured to determine the amplitude of the source power output by the external power source 99. The controller 50 is configured to switch the FETs 32 and 34 based on the power source voltage value of the source power as determined.

As described above, the printing device 1 is configured to change the electrical power supplying source of the print head 21 by switching the FETs 32 and 34 with the controller 50. The controller 50 is configured to switch the FETs 32 and 34 based on the power source voltage value of the source power determined by the USB PD controller 80. According to the above configuration, the printing device 1 is configured such that, when the voltage supplied by the external power source 99 is high, the source power is not transmitted to the print head 21 through the second line 37. Accordingly, it is unnecessary to provide a voltage lowering circuit to the second line 37. Therefore, although the printing device 1 is configured to be connected to the external power source 99 capable of supplying the multiple power source voltages can be downsized easily.

The second line 37 is directly connected to the print head and the USB connector 91. That is, the second line 37 is not provided with the voltage lowering circuit to lower the voltage transmitted from the USB connector 91 to the print head 21, and thus, downsizing of the printing device 1 can be realized easily.

The printing device 1 is provided with the FET 6. The FET 61 is provided to the third line 38 and switches start and stop of transmission of electricity through the third line 38 by connecting and disconnecting between the switch 35 and the battery 71. The controller 50 switches the state of the FET 62 based on the power source voltage value of the source power determined by the USB PD controller 80. In this case, the controller 50 switches start and stop charging the battery 71 by switching the state of the FET 62. According to the above configuration of the printing device 1, a disorder due to excessive power supply (e.g., overvoltage) to the battery 71 can be suppressed.

The printing device 1 has the switch 35. One end of the switch 35 is connected to both the second line 37 and the third line 38, and the other end of the switch 35 is connected to the USB connector 91. The switch 35 is configured to switch start and stop of transmission of electricity relayed by the USB connector 91 through the second line 37 and the third line 38 by connecting and disconnecting between the USB connector 91 and both the second line 37 and the third line 38. The USB PD controller 80 is configured to control the switch 35 to change its state. It is noted that, by appropriately controlling the switch 35 to change its state, an unintended transmission of source power to the print head 21 and the battery 71 can be suppressed.

It is noted that the USB PD controller 80 is an example of an obtaining part and a setting part according to aspects of the present disclosures. The voltage detector 73 is an example of a detector according to aspects of the present disclosures. The USB connector 91 is an example of a USB port according to aspects of the present disclosures. The FET 34 is an example of a first switch according to aspects of the present disclosures. The FET 32 is an example of a second switch according to aspects of the present disclosures. The controller 50 is an example of a first controller and a second controller according to aspects of the present disclosures. The FET 62 is an example of a third switch according to aspects of the present disclosures. The USB PD controller 80 is an example of a third controller according to aspects of the present disclosures. The switch 35 is an example of a fourth switch according to aspects of the present disclosures.

It is noted that aspects of the present disclosures do not need to be limited to the configuration of the above-described embodiment. That is, the above-described embodiment can be modified in various ways without departing from aspects of the present disclosures. For example, modifications described below may be applied to the configuration of the above-described embodiment. Further, appropriate combinations of the modifications described below may fall within aspects of the present disclosure.

The printing device 1 may not have the mounter 3. In such a case, the battery 71 may be accommodated in the housing 2 and may not be detachable. The printing device 21 may not be provided with the switch 35. In such a case, a switch configured to start and stop transmission of electricity through the second line 37 and the third line 38 may be provided on the cable 98. The switch 35 may not be controlled by the USB PD controller 80, but may be controlled by the controller 50.

It is noted that a voltage lowering circuit or a voltage boosting circuit may be provided to the first line 36 or the second line 38. It is noted that a switch other than an FET may be provided to the first line 36, the second line 37 or the third line 38 instead of the FET 32, the FET 34 and the FET 63. The switch which is provided to each of the first line 36, the second line 37 and the third line 38 may be, for example, a relay switch.

Whether the battery 71 is attached to the mounter 3 may be detected using a limit switch instead of the detector 73. In such a case, the CPU 51 may be configured to make a determination in S14 based on a detection result of the limit switch. The battery 71 may not be provided with the thermistor 72.

The USB PD controller 80 may be hardware or program-implemented hardware. When the USB PD controller 80 is configured by the hardware, the electrical power determining process may be performed such that the CPU 51 controls the USB PD controller 80. In such a case, the controller 50 is an example of an obtaining part, a setting part and a third controller according to aspects of the present disclosures.

It is noted that each process performed by the printing device 1 does not need to be performed by the CPUs of respective devices. A part or all of the processes may be performed by another electronic device (e.g., ASIC). Alternatively or optionally, each process performed by the printing device 1 may be performed by a plurality of electronic devices (e.g., a plurality of CPUs) in a distributed manner. For example, a part of the electrical power determining process may be performed by the CPU 51.

According to the above-described embodiment, the printing device 1 is connected to the external power source 99 by a connection compliant with the USB PD standard. Aspects of the present disclosures do not need to be limited to such a configuration. That is, the printing device 1 may be connected to the external power source 99 by a connection compliant with the USB BC standard or any other standard other than the USB standard. When the printing device 1 is connected to the external power source 99 by a connection other than the USB standard, the printing device 1 may not be provided with the USB connector 91.

It is only necessary that programs causing the CPUs 51 and 81 to perform the above-described processes are stored in storages of respective devices before executed by the CPUs 51 and 81. Therefore, obtaining methods and obtaining routes of the programs, and storages for storing respective programs may be determined appropriately. For example, a program executed in the printing device 1 may be received from another device through a cable or a wireless communication and stored in a non-transitory recording medium such as the flash memory 54. In such a case, the other device may be a PC, or a server connected to the printing device 1 through a network.

In each of the processes performed by the printing device 1, change of the order of execution steps, omission or addition of execution steps may be done when necessary. It is also noted that a case where an OS running on the printing device 1 performs a part or all of the processes in accordance with commands output by the CPUs 51 and 81 may be included in aspects of the present disclosures.

What is claimed is:

1. A printing device configured to be connected to an external power source capable of outputting an electrical power corresponding to one of a plurality of voltage values, comprising:
   a power controller configured to:
      obtain the plurality of voltage values from the external power source; and
      set an amplitude of the electrical power to be output by the external power source based on the plurality of obtained voltage values;

a print head with a particular rated voltage value configured to perform printing on a printing medium using an electrical power supplied from an electrical power supplying source, the electrical power supplying source being one of the external power source and a battery charged by the electrical power supplied by the external power source;

a USB port configured to be connected to the external power source with a connection compliant with a USB standard, the electrical power being supplied to the print head and the battery from the external power source through the USB port; and a controller, wherein the controller is configured to perform:

obtaining a power source voltage value which is the voltage value of the electrical power to be output by the external power source set by the power controller;

comparing the power source voltage value with the rated voltage value before the electrical power is supplied to the print head;

when the power source voltage value is larger than the rated voltage value, determining the battery as the electrical power supplying source to be used to supply the electrical power to the head;

when the power source voltage value is equal to or less than the rated voltage value, determining the external power source as the electrical power supplying source to be used to supply the electrical power to the head, and after the controller determines the electrical power supplying source based on whether the power source voltage value is larger than the rated voltage value, causing the electrical power supplying source to supply the electrical power to the head, wherein the print head is configured to perform the printing using the electric power supplying source determined by the controller.

2. The printing device according to claim 1, wherein the battery is detachably attached to the printing device, wherein the controller is configured to detect whether the battery is attached to the printing device, wherein, when the controller determines that the battery is not attached to the printing device:

the controller determines the external power source as the electrical power supplying source even though the power source voltage value exceeds the rated voltage value; and the power controller sets the power source voltage value to the rated voltage value or less.

3. The printing device according to claim 2, wherein, when each of the plurality of voltage values is equal to or less than the rated voltage value, the power controller selects a largest voltage value among the plurality of voltage values, and wherein, when there is at least one voltage value larger than the rated voltage value among the plurality of voltage values, the power controller selects a smallest voltage value among the at least one voltage value larger than the rated voltage value.

4. The printing device according to claim 1, further comprising a detector configured to detect a voltage of the battery and output a detection result, wherein the controller is further configured to:

determine whether the battery is to be charged based on the detection result when the electrical power supplying source is the battery and printing by the print head is being performed; and when the controller determines that the battery is to be charged, stop printing with the print head and charge the battery with an electrical power supplied by the external power source.

5. The printing device according to claim 1, further comprising:

a detector configured to detect a voltage of the battery and output a detection result; and an input part configured to receive a print command instructing printing by the print head, wherein the controller is configured to:

determine whether the battery is to be charged based on the detection result when the electrical power supplying source is the battery;

when the controller determines that the battery is to be charged, charge the battery with an electrical power supplied by the external power source;

when the print command is received from the input part during the charging of the battery, stop charging the battery and perform printing with the print head.

6. The printing device according to claim 1, wherein the power controller selects one of the plurality of voltage values obtained and sets the amplitude of the electrical power output by the external power source based on the selected one of the plurality of voltage values.

7. A printing device connectable to an external power source which is configured to selectively output one of a plurality of source powers, the plurality of source powers corresponding to a plurality of voltage values, respectively, the printer comprising:

a print head configured to perform printing on a printing medium;

a rechargeable battery detachably attached to the printing device;

a first line configured to transmit an electrical power discharged by the battery to the print head;

a first switch configured to switch start and stop of transmission of the electrical power through the first line;

a USB port connected to the external power source in accordance with a connection compliant with a USB standard, the USB port being configured to relay the electrical power supplied by the external power source;

a second line configured to transmit the electrical power relayed by the USB port to the print head;

a second switch configured to switch start and stop of transmission of the electrical power through the second line;

a third line configured to transmit the electrical power relayed by the USB port to the battery;

a power controller configured to select, from among the plurality of source powers, a source power to be output by the external power source; and a first controller configured to control switching of the first switch and the second switch based on a voltage value corresponding to the source power, which is selected by the power controller, to be output by the external power source.

8. The printing device according to claim 7, wherein the second line is directly connected to the USB port and the print head, the electrical power relayed by the USB port being directly transmitted to the print head.

9. The printing device according to claim 7, further comprising:
- a third switch configured to switch start and stop of transmission of the electrical power through the third line, and
- a second controller configured to control switching of the third switch based on the voltage value set by the power controller.

10. The printing device according to claim 7, further comprising:
- a fourth switch configured to switch start and stop of relaying of electrical power at the USB port, the USB port being provided between the USB port and both the second line and the third line; and
- a third controller configured to control switching of the fourth switch.

* * * * *